United States Patent
Maruyama et al.

(10) Patent No.: US 10,371,144 B2
(45) Date of Patent: Aug. 6, 2019

(54) LINEAR MOTOR, COMPRESSOR EQUIPPED WITH LINEAR MOTOR AND EQUIPMENT EQUIPPED WITH LINEAR MOTOR

(71) Applicant: Hitachi, Ltd., Tokyo (JP)

(72) Inventors: Eri Maruyama, Tokyo (JP); Yasuaki Aoyama, Tokyo (JP); Takahiro Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 726 days.

(21) Appl. No.: 14/884,189

(22) Filed: Oct. 15, 2015

(65) Prior Publication Data

US 2016/0134181 A1 May 12, 2016

(30) Foreign Application Priority Data

Nov. 7, 2014 (JP) .................. 2014-226583

(51) Int. Cl.
| | |
|---|---|
| *F04B 53/04* | (2006.01) |
| *F04B 53/14* | (2006.01) |
| *F04B 35/04* | (2006.01) |
| *F04B 49/06* | (2006.01) |
| *H02K 41/03* | (2006.01) |
| *H02K 3/28* | (2006.01) |
| *H02K 11/225* | (2016.01) |

(52) U.S. Cl.
CPC ............ *F04B 53/14* (2013.01); *F04B 35/045* (2013.01); *F04B 49/06* (2013.01); *H02K 41/031* (2013.01); *F04B 2203/0401* (2013.01); *F04B 2203/0402* (2013.01); *H02K 3/28* (2013.01); *H02K 11/225* (2016.01)

(58) Field of Classification Search
CPC .......... F04B 35/04; H02K 41/02; H02K 41/03
See application file for complete search history.

(56) References Cited

U.S. PATENT DOCUMENTS

| | | | | | |
|---|---|---|---|---|---|
| 5,172,562 | A | * | 12/1992 | Manz ...................... | F25B 45/00 62/149 |
| 5,214,932 | A | * | 6/1993 | Abdelmalek ........ | B01D 53/002 60/651 |
| 6,138,459 | A | * | 10/2000 | Yatsuzuka ............. | F04B 35/045 62/6 |
| 6,334,758 | B1 | * | 1/2002 | Popov ...................... | F04F 5/54 417/105 |

(Continued)

FOREIGN PATENT DOCUMENTS

| | | |
|---|---|---|
| JP | 07-004763 A | 1/1995 |
| JP | 2011-223697 A | 11/2011 |

*Primary Examiner* — Patrick Hamo
(74) *Attorney, Agent, or Firm* — Mattingly & Malur, PC

(57) ABSTRACT

There is provided a linear motor that can detect the displacement of a moving member or the inclination of the moving member in a direction in which two windings are opposed to each other and equipment equipped with the linear motor. A linear motor includes: a first armature having an upper winding and a lower winding opposed to the upper winding through a gap in a vertical direction; a moving member having a permanent magnet and enabled to reciprocate in a longitudinal direction with respect to the first armature; and a current detecting unit that detects an electric current carried through the first armature. The upper winding and the lower winding are in parallel connection.

8 Claims, 15 Drawing Sheets

(56) References Cited

U.S. PATENT DOCUMENTS

| | | | | |
|---|---|---|---|---|
| 8,656,891 | B2* | 2/2014 | Stewart | F02M 59/48 |
| | | | | 123/495 |
| 8,810,082 | B2* | 8/2014 | Aoyama | H02K 41/03 |
| | | | | 310/12.22 |
| 2011/0248579 | A1 | 10/2011 | Aoyama | |
| 2013/0154398 | A1* | 6/2013 | Kim | H02K 41/031 |
| | | | | 310/12.24 |
| 2014/0110508 | A1* | 4/2014 | Dames | H01F 7/1646 |
| | | | | 239/585.1 |
| 2015/0263577 | A1* | 9/2015 | Aaltonen | H02K 21/12 |
| | | | | 318/16 |

* cited by examiner

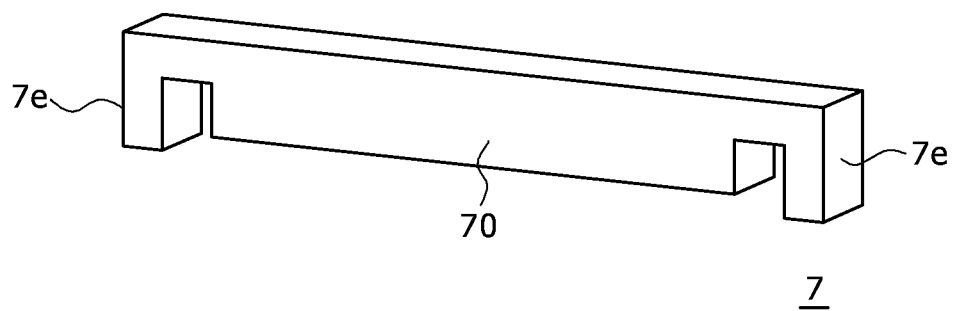
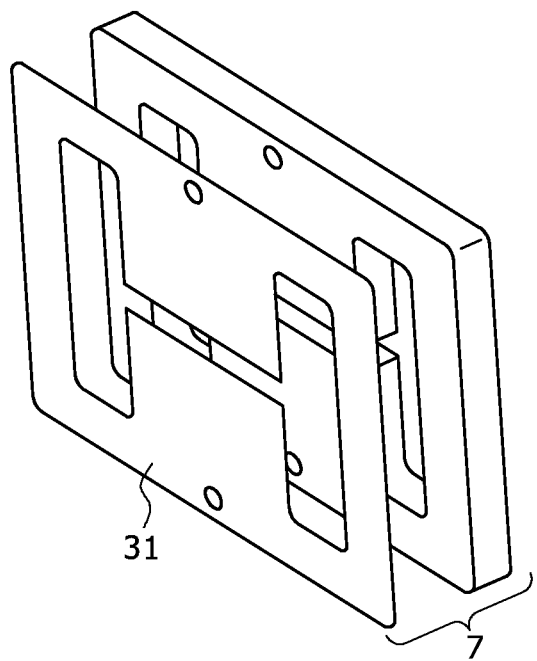

LINEAR MOTOR, COMPRESSOR EQUIPPED WITH LINEAR MOTOR AND EQUIPMENT EQUIPPED WITH LINEAR MOTOR

BACKGROUND

The present invention relates to a linear motor, a compressor equipped with the linear motor and equipment equipped with the linear motor.

For techniques related to linear motors, there are known a linear motor described in Japanese Unexamined Patent Application Publication No. 2011-223697 in which the linear motor includes magnetic pole teeth disposed to sandwich and hold permanent magnets disposed on a moving member to cause the moving member reciprocate, and a linear motor using magnetic levitation techniques as described in Japanese Unexamined Patent Application Publication No. Hei 7-4763, for example.

SUMMARY

Generally, the moving member of the linear motor as one described in Japanese Unexamined Patent Application Publication No. 2011-223697 reciprocates as guided by guide rails. Therefore, friction losses are produced on the guide rails, on which the moving member is slid. It can be thought that friction losses are reduced using magnetic bearing techniques as described in Japanese Unexamined Patent Application Publication No. Hei 7-4763. However, a piston shaft (a moving member) in driving is sometimes displaced or inclined in the direction orthogonal to the reciprocating direction. Therefore, it is possible that the moving member is contacted with a stator and damaged unless some attitude control is performed. However, Japanese Unexamined Patent Application Publication No. Hei 7-4763 describes no specific forms of attitude control.

A linear motor, which is made in view of the above circumferences, according to an aspect of the present invention is a linear motor including: a first armature having an upper winding and a lower winding opposed to the upper winding through a gap in a vertical direction; a moving member having a permanent magnet and enabled to reciprocate in a longitudinal direction with respect to the first armature; and a current detecting unit that detects an electric current carried through the first armature. The upper winding and the lower winding are in parallel connection.

According to an aspect of the present invention, it is possible to provide a linear motor that can detect the displacement of a moving member or the inclination of the moving member in a direction in which two windings are opposed to each other and equipment equipped with the linear motor.

The other configurations, subjects, and effects of an aspect the present invention will be apparent from the description of embodiments.

BRIEF DESCRIPTION OF THE DRAWINGS

FIG. 4 is a perspective view of a magnetic pole according to the first embodiment;

FIG. 5 is a diagram of another exemplary configuration of a magnetic pole;

DETAILED DESCRIPTION

Figure 1:
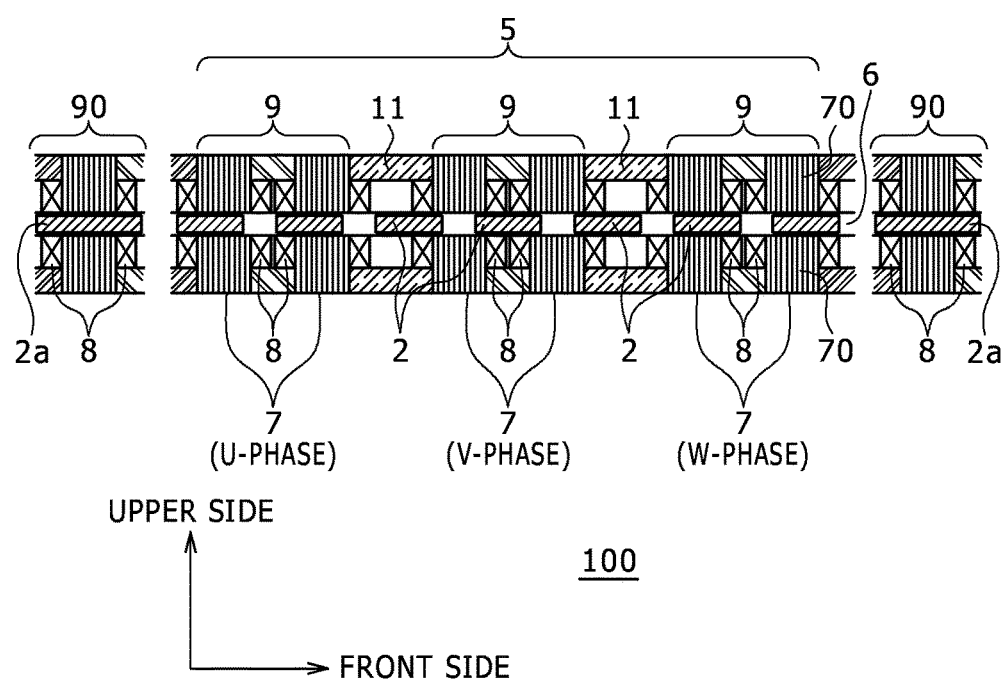
FIG. 1 is a side cross sectional view of a linear motor according to a first embodiment.

In the following, embodiments of the present invention will be described with reference to the accompanying drawings. The terms "vertical direction", "lateral direction", and "longitudinal direction" are used for describing the embodiments. However, the vertical direction is not necessarily in parallel with the direction of gravity. The lateral direction, the longitudinal direction, and other directions are permitted in parallel with the direction of gravity.

Various components according to an embodiment of the present invention are not necessarily independent components. The following is permitted. One component is configured of a plurality of members, a plurality of components is configured of one member, a part of a component is a part of another component, and a part of a component overlaps a part of another component, and other forms.

Similar components are designated similar reference numerals and signs, and similar description is not repeated.

First Embodiment

<Outline of a Linear Motor 100>

First, the outline of a linear motor 100 according to a first embodiment will be described.

FIG. 1 is a side cross sectional view of the linear motor 100 according to the embodiment. The linear motor 100 includes a stator 5 and a moving member 6 relatively displaceable to the stator 5. In the following, the relative displacement direction of the moving member 6 is called a longitudinal direction.

The stator 5 has a first armature 9 including two magnetic poles 7 opposed to each other through a gap and two windings 8 wound on the magnetic poles 7. In the following, the opposing direction is called a vertical direction.

The first armature 9 gives thrust to the moving member 6 to reciprocate in the longitudinal direction. The stator 5 has a spacer 11 formed of a non-magnetic substance between the first armatures 9. The moving member 6 is disposed in the gap. In the following, two windings 8 wound on the two magnetic poles 7 opposed to each other through the gap are called a winding set, and the regions of two magnetic poles 7 (magnetic pole teeth 70) located on the inner side of the two windings 8 are called a magnetic pole tooth set.

The numbers of the magnetic pole tooth sets and the winding sets of the first armature 9 are any number that is one or greater. In the embodiment, the numbers are two. The number of the first armatures 9 is any number that is one or greater. In the embodiment, three first armatures 9 are arrayed in the longitudinal direction.

A symmetric three-phase alternating current is applied to the first armature 9. In the following, these three first armatures 9 are sometimes called a U-phase, V-phase, and W-phase.

A second armature 90 is disposed in the longitudinal direction of the first armature 9. The second armature 90 also includes a magnetic pole tooth set and a winding set. The number of the second armatures 90 is any number. In the embodiment, one second armature 90 is disposed each on the front and rear of the center of gravity of the moving member 6 in the longitudinal direction. The second armature 90 gives force to the moving member 6 in a direction orthogonal to the longitudinal direction. Thus, the moving member 6 can be levitated and held in the gap between the winding sets included in the first armature 9.

In the embodiment, the force that the second armature 90 gives the moving member 6 is called magnetic levitation force. The orientation of the magnetic levitation force is the vertical direction. The vertical direction in the embodiment is in parallel with the direction of gravity. However, the other relationships may be possible. The moving member 6 may be levitated with a configuration other than the second armature 90.

The moving member 6 has one or more permanent magnets 2 in the gap between the winding sets of the first armature 9. The moving member 6 includes a permanent magnet 2a in the gap between the winding set of the second armature 90. The moving member 6 is in a flat plate shape having the permanent magnets 2 and 2a.

The permanent magnets 2 and 2a are in a flat plate shape arrayed in the longitudinal direction. The permanent magnets 2 and 2a have polarities in the vertical direction.

The number of the permanent magnet 2 is one, or two or more. In the case where the number is two or more, the orientations of the polarities are arrayed as alternately inverted. The permanent magnet 2 can be opposed to at least one magnetic pole tooth set of the first armature 9 through the reciprocation of the moving member 6.

The length of the permanent magnet 2a in the longitudinal direction is longer than the length of the permanent magnet 2, and the permanent magnet 2a can be opposed to the magnetic pole tooth set of the second armature 90 through the reciprocation of the moving member 6.

The spacer 11 formed of a non-magnetic substance can be configured using austenitic stainless steel, an aluminum alloy, ceramic, and resin material such as an engineering plastic.

<The First Armature 9 and the Second Armature 90>

Next, referring to FIGS. 2 to 5, the configurations of the first and second armatures 9 and 90 will be described. Differences in the functions between the first and second armatures 9 and 90 are caused by the waveforms of electric currents applied to the windings 8 of the armatures 9 and 90, the polarities of the opposing permanent magnets, and other parameters. The structures of the first and second armatures 9 and 90 themselves can be similarly formed. In the embodiment, the structures are different. The first armature 9 includes two magnetic pole tooth sets and two winding sets, whereas the second armature 90 has one magnetic pole tooth set and one winding set. However, the first and second armatures 9 and 90 can be similarly formed.

Figure 2:
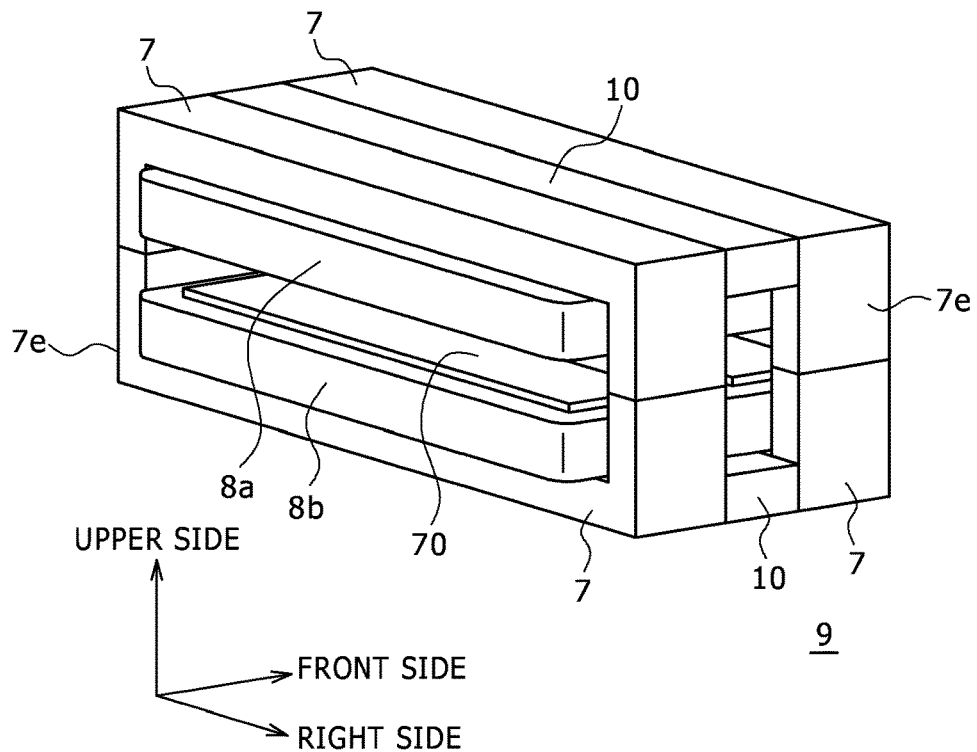
FIG. 2 is a perspective view of a first armature according to the first embodiment.
Figure 3:
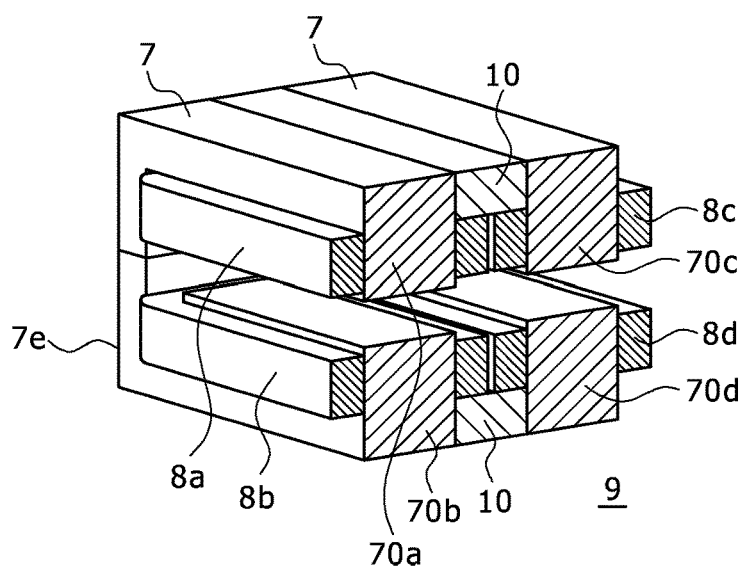
FIG. 3 is a perspective view of the cross section of the first armature according to the first embodiment.

FIG. 2 is a perspective view of the first armature 9 according to the embodiment. FIG. 3 is a perspective view of the cross section of the first armature 9 according to the embodiment. FIG. 4 is a perspective view of the magnetic pole 7 according to the embodiment.

The first armature 9 has a symmetric structure with respect to a bridge 10 formed of a magnetic substance. The structure of the first armature 9 on one side in the longitudinal direction is similar to the structure of the second armature 90.

As illustrated in FIGS. 2 and 3, the first armature 9 includes four magnetic poles 7, four windings 8 (8a to 8d), and two bridges 10. The magnetic pole 7 includes the magnetic pole tooth 70 wound with the winding 8 and an iron core 7e located on both sides of the magnetic pole tooth 70 in the lateral direction. In other words, one magnetic pole tooth set and one winding set are located on both sides of the bridge 10 in the longitudinal direction. As illustrated in FIG. 4, the iron core 7e is more protruded in the vertical direction beyond the magnetic pole tooth 70.

Two magnetic poles 7 are joined to each other in the vertical direction through the iron core 7e, and located on both sides of the bridge 10 of the first armature 9 in the longitudinal direction. Because the two magnetic poles 7 are joined to each other, two magnetic pole teeth 70 (a magnetic pole tooth set) are formed, which are opposed to each other through the gap in the vertical direction. In the following, the magnetic pole tooth 70 on the upper side (e.g. magnetic pole teeth 70a and 70c in FIG. 3) is called an upper magnetic pole tooth, and the magnetic pole tooth 70 on the lower side (e.g. magnetic pole teeth 70b and 70d in FIG. 3) is called a lower magnetic pole tooth.

The winding 8 (8a and 8c) wound on the upper magnetic pole tooth is called an upper winding, and the winding 8 (8b and 8d) wound on the lower magnetic pole tooth is called a lower winding.

As illustrated in FIG. 5, the magnetic pole 7 may be formed in an integrated structure in the vertical direction.

The magnetic pole 7 may be formed in a structure in which a flat-rolled magnetic steel sheet 31 is laminated in the longitudinal direction. Thus, an iron loss of the stator 5 can be reduced. In addition to the flat-rolled magnetic steel sheet, an amorphous core, FINEMET (registered trademark) core, and dust core may be used. For example, in the case where a ferrite magnet, which is a low brazing sheet lower than a neodymium magnet, is used for the permanent magnet 2, amorphous characteristics are preferable.

The order of arraying the first and second armatures 9 and 90 is not limited specifically.

<Relationship Between the Magnetic Pole Tooth and Magnetization>

An electric current is carried through the windings 8 wound on the magnetic poles teeth 70 to allow the magnetization of the magnetic pole teeth 70. The winding 8 is disposed in such a manner that one magnetic pole tooth 70 and another magnetic pole tooth 70, which is diagonally opposed to the one magnetic pole tooth 70 through the bridge 10 and the gap, are magnetized in the same polarity and magnetic pole teeth 70 opposed to each other or magnetic pole teeth 70 adjacent to each other through the bridge 10 are magnetized in different polarities. For example, in FIG. 3, the winding 8 is disposed in such a manner that in the case where the magnetic pole tooth 70a is magnetized in the north pole, the magnetic pole tooth 70b and the magnetic pole tooth 70c are magnetized in the south pole and the magnetic pole tooth 70d is magnetized to the north pole.

<Application of Thrust>

Figure 6:
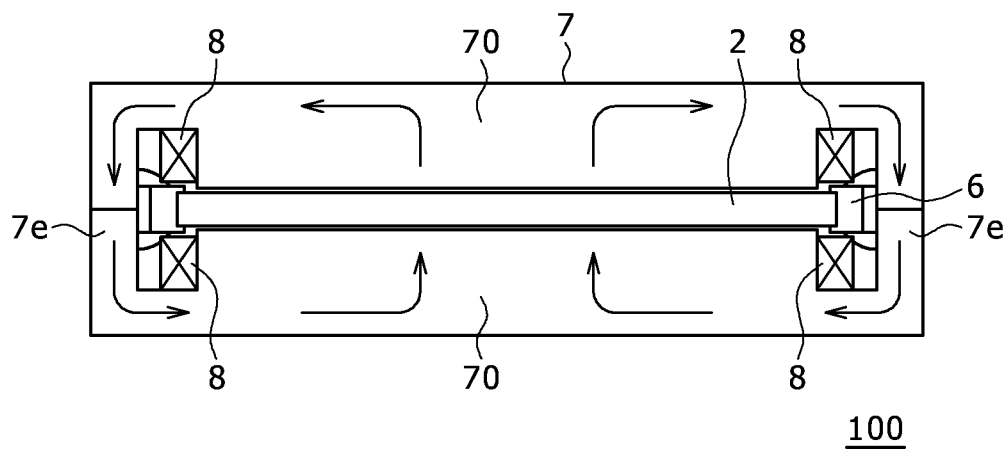
FIG. 6 is a schematic cross sectional view of the front side of the linear motor according to the first embodiment.
Figure 7:
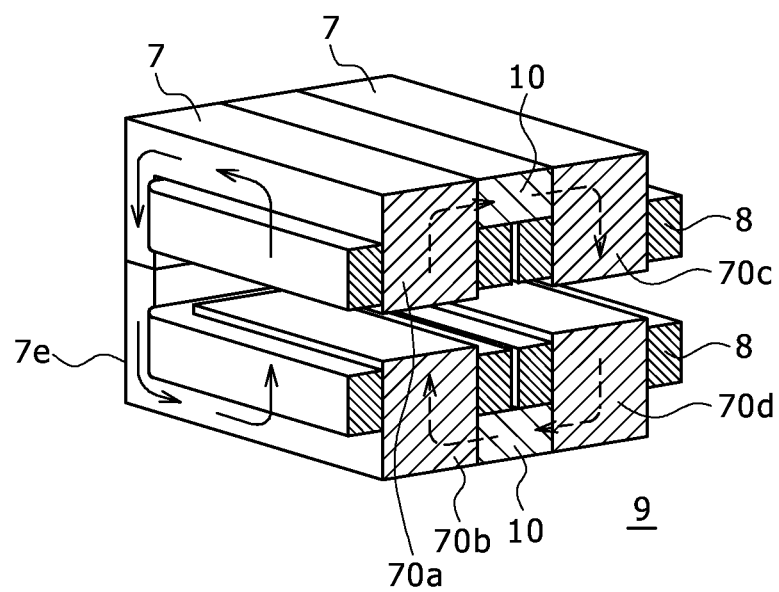
FIG. 7 is a perspective cross sectional view of the side face of the first armature according to the first embodiment.

Next, a magnetic flux flow in the first armature 9 will be described. FIG. 6 is a schematic cross sectional view of the front side of the linear motor 100. FIG. 7 is a perspective cross sectional view of the side face of the first armature 9.

In FIGS. 6 and 7, solid arrows denote examples of magnetic flux flows in driving the linear motor 100. Because the orientation of the magnetic flux flow is possibly directed in the reverse direction depending on the orientation of an electric current carried through the windings 8, any orientations are possible, other than the ones in FIGS. 6 and 7. An alternating current is applied to the windings 8 of the first armature 9, as described above. For example, a sine wave alternating current and a square wave alternating current can be applied to the windings 8. Specifically, in the case where three first armatures 9 are provided, a symmetric three-phase alternating current can be applied.

An electric current is carried through the winding 8 to mainly produce magnetic flux flows depicted by solid lines in the magnetic pole 7. The magnetic flux flow forms a loop that passes through the gap between two magnetic pole teeth 70 for one time and then passes through the iron cores 7e. The loop is present in a plane formed in the lateral direction and the vertical direction.

Because the bridge 10 is formed of a magnetic substance, a loop depicted by a broken arrow is also formed. This loop is present in a plane formed in the longitudinal direction and the vertical direction.

As described above, in accordance with the first armature 9 according to the embodiment, a three-dimensional magnetic circuit can be configured. Thus, the magnetic flux saturation of the magnetic pole 7 can be reduced, and a high thrust can be given to the moving member 6.

<Application of Magnetic Levitation Force>

The moving member 6 is driven to reciprocate in the longitudinal direction in a range in which the permanent magnet 2a can be opposed to the second armature 90. The windings 8 of the second armature 90 are applied with an electric current that magnetizes the magnetic pole tooth 70 to have the same polarity as the polarity of the opposed permanent magnet 2a. Thus, to the moving member 6, upward force is given from the lower magnetic pole tooth 70 of the second armature 90, and downward force is given from the upper magnetic pole tooth 70. Therefore, the moving member 6 is stabilized at the position (the shaft center) between the magnetic pole tooth sets in the vertical direction. In other words, the moving member 6 is levitated. However, as described later, the polarity of the electric current can be changed when the moving member 6 is eccentric, which the moving member 6 is displaced in the vertical direction, or the moving member 6 is inclined.

The first armature 9 opposed to at least the permanent magnet 2 gives reciprocating force (thrust) to the moving member 6, and the second armature 90 opposed to at least the permanent magnet 2a gives magnetic levitation force to the moving member 6. Therefore, the electric current to the windings 8 of the first armature 9 is controlled as the levitation of the moving member 6 is maintained by controlling the electric current to the windings 8 of the second armature 90. Thus, it is possible to facilitate the control of the reciprocation length of the moving member 6 and the period of reciprocation (a drive frequency).

In the embodiment, three first armatures 9 are provided for symmetric three-phase drive. However, single-phase drive including one first armature 9 or multi-phase drive including two or four or more first armatures 9 may be possible.

In the embodiment, two second armatures 90 are provided in such a manner that two second armatures 90 are located on the opposite sides as sandwiching the center of gravity of the moving member 6. Thus, the moving member 6 can be efficiently levitated. However, in the case where the moving member 6 is connected to a member that is contacted with another member (e.g. a cylinder) such as the piston of a compressor, one second armature 90 may be provided because the moving member 6 is supported in contact with the piston. In this case, the second armature 90 and the other member can be provided on the opposite sides as sandwiching the center of gravity of the moving member 6 as well as on the same side, depending on the strength of supporting the moving member 6 by the other member. The moving member 6 may be magnetically levitated with a configuration other than the configuration of the second armature 90.

<Control System 1000>

Figure 8:
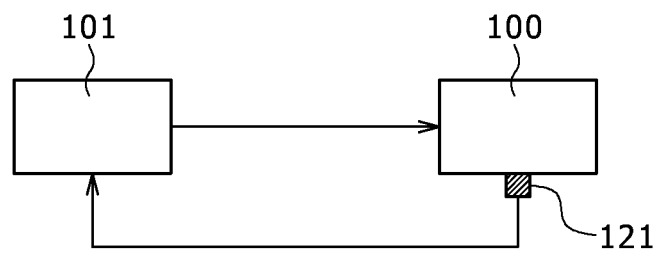
FIG. 8 is a diagram of a component block of a control system according to the first embodiment.

Referring to FIGS. 8 to 10, a control system 1000 of the linear motor 100 according to the embodiment will be described. FIG. 8 is a block diagram of the configuration of the control system 1000 according to the embodiment.

The control system 1000 includes a linear motor 100, a control unit 101, and a current sensor 121 that is an example of a current detecting unit.

The current sensor 121 detects values of currents carried through the upper winding 8 and the lower winding 8 of one phase (the first armature 9) or two phases or greater. The control unit 101 calculates the circulating current values of the phases including the current sensor 121 using the detected current values. The circulating current value is observed when the amount of eccentricity, which is a displacement amount A in the vertical direction in the embodiment, is produced in the moving member 6 opposed to the phases. The displacement amount A is estimated using this circulating current value, and an input current or input voltage to the winding 8 is controlled to reduce the circulating current. In the following, the control system 1000 will be described in detail.

Figure 9A:
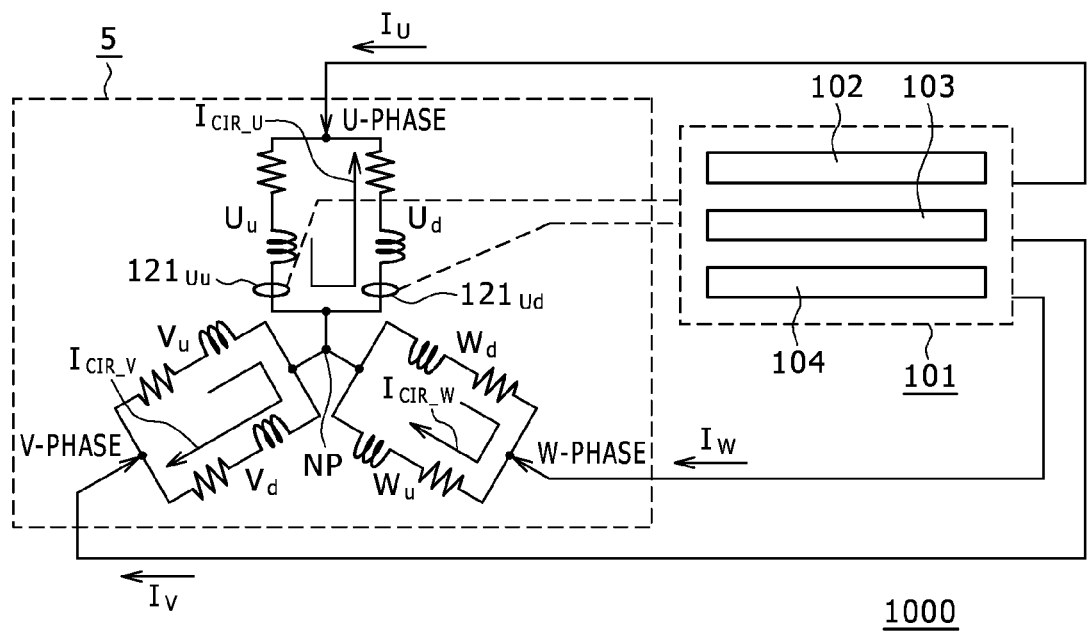
FIG. 9A is a block diagram of a circuit involved in driving the first armature of the control system according to the first embodiment.
Figure 9B:
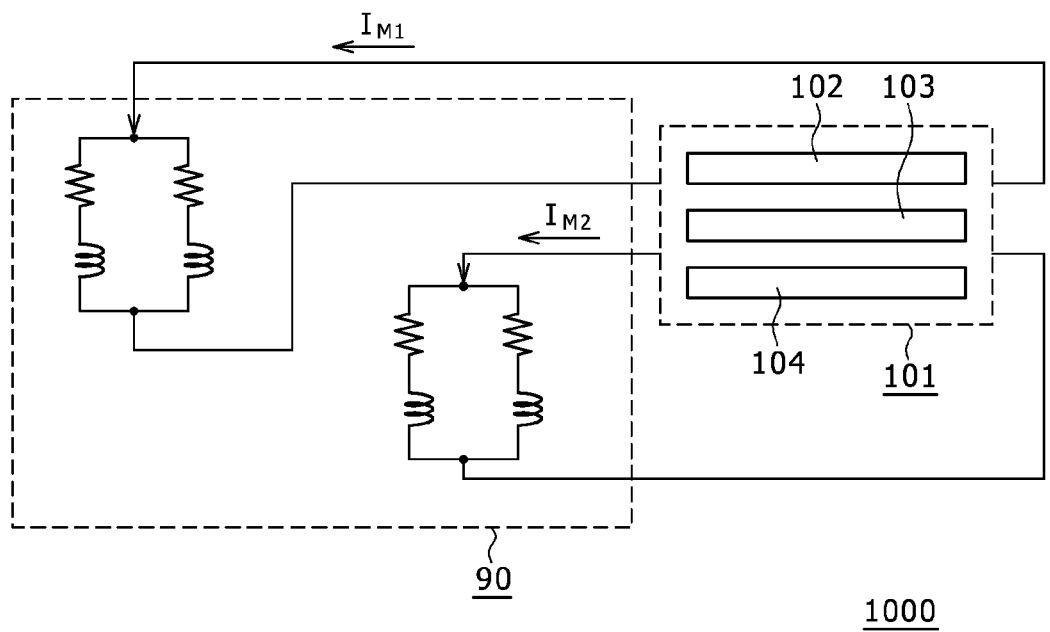
FIG. 9B is a block diagram of a circuit involved in driving a second armature of the control system according to the first embodiment.

FIGS. 9A and 9B are block diagrams of the circuits of the control system 1000 according to the embodiment.

The linear motor 100 according to the embodiment is a three-phase drive motor, and the windings 8 belong to the U-phase, the V-phase, and the W-phase. The motor does not necessarily include three phases. The motor may include one phase, two phases, four phases, or greater in order to achieve the effect of the embodiment.

<Expressions of Coils>

In the following, the coils of the phases are sometimes expressed by three characters, $X_{YZ}$, for explanation.

The character "X" expresses to which phase the coil belongs. The U-phase, the V-phase, and the W-phase are expressed by characters, U, V, and W, respectively. However, the phases are denoted as "X" with no discrimination among the phases.

The character "$_Y$" expresses a coil that is located on the upper side or the lower side of the X-phase. The character "u" expresses that the coil is located on the upper side, and the character "d" expresses that the coil is located on the lower side.

The character "$_Z$" expresses that the coil is located on the front side or the rear side of the X-phase. The numeral "1" expresses that the coil is located on the front side, and the numeral "2" expresses that the coil is located on the rear side.

For example, FIG. 3 is taken as an example for description. In the case where the first armature 9 in FIG. 3 is the U-phase, coils (the windings 8) wound on the magnetic pole teeth 70a, 70b, 70c, and 70d are expressed by $U_{u1}$, $U_{d1}$ $U_{u2}$ and $U_{d2}$.

As described later, because the linear motor 100 includes at least one armature provide with the current detecting unit, and thus the displacement amount (the eccentricity) A of the moving member 6 can be obtained. The linear motor 100 includes at least two armatures provided with the current detecting unit, and thus the inclination amount of the moving member 6 can be obtained.

<Connections Among Coils of the Phases>

The phase X includes four windings 8 (an upper front coil $X_{u1}$, an upper rear coil $X_{u2}$, a lower front coil $X_{d1}$, and a lower rear coil $X_{d2}$). In the vertical direction, the coils $X_{u1}$ and $X_{d1}$ are opposed to each other, and the coils $X_{u2}$ and $X_{d2}$ are opposed to each other.

These four windings 8 can be connected to one another. For example, in FIG. 10A, a front coil $X_1$ and a rear coil $X_2$ are in parallel connection on the same side in the vertical direction. In FIG. 10B, a front coil $X_1$ and a rear coil $X_2$ are in series connection. In the following, an upper coil $X_u$ expresses a coil that the coils $X_{u1}$ and $X_{u2}$ are combined in parallel connection or in series connection. A lower coil $X_d$ expresses a coil that the coil $X_{d1}$ and $X_{d2}$ are combined in parallel connection or in series connection. However, as described above, the phase X may have one winding set. In this case, the upper coil $X_u$ expresses one upper front coil $X_{u1}$ or one upper rear coil $X_{u2}$, and the lower coil $X_d$ expresses one lower front coil $X_{d1}$ or one lower rear coil $X_{d2}$. In the case where the phase X includes three or more upper windings 8 and three or more lower windings 8, the upper coil $X_u$ expresses a coil that the upper windings 8a, 8c, . . . are combined, and the lower coil $X_d$ expresses a coil that the lower windings 8b, 8d, . . . are combined.

Next, as illustrated in FIG. 9A, the phase X has a parallel circuit in which the upper coil $X_u$ is connected in parallel with the lower coil $X_d$. In FIG. 9A, resisters connected in series to the coils are resistance components of the coils. Because the upper coil $X_u$ is connected in parallel with the lower coil $X_d$, a circulating current $I_{CIR\_X}$ carried through the upper coil $X_u$ and the lower coil $X_d$ is produced in the phase X.

Figure 10A:
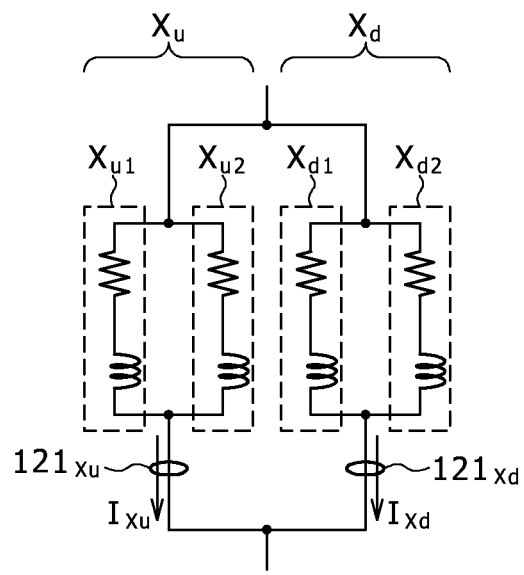
FIG. 10A is a circuit diagram of connections among four coils of the first armature in the case where a front coil and a rear coil are connected in parallel.
Figure 10B:
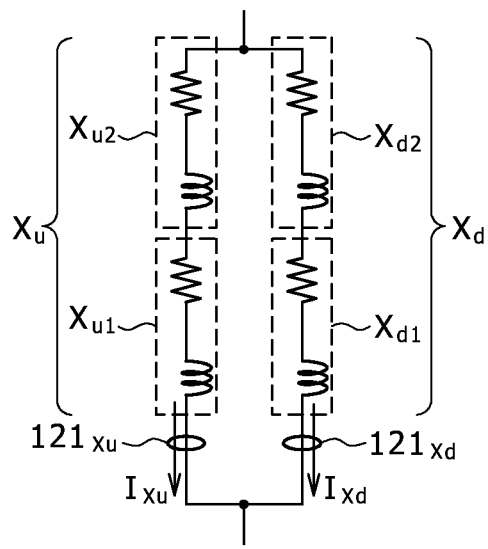
FIG. 10B is a circuit diagram in the case where a front coil and a rear coil are connected in series.

The coils $X_u$ and $X_d$ in FIG. 9A may have any configurations illustrated in FIGS. 10A and 10B. The combined resistance components and combined inductance components (combined impedances) of the coils, which are obtained in the coils $X_u$ and $X_d$ in FIGS. 10A and 10B, are the resistances and inductances (impedances) of the coils $X_u$ and $X_d$ in FIG. 9A.

As illustrated in FIG. 10B, when the upper coil $X_u$ is obtained in combination in series connection, the lower coil $X_d$ is a combined coil in series connection. When the upper coil $X_u$ is obtained in combination in parallel connection, the lower coil $X_d$ is a combined coil in parallel connection.

In the case of FIG. 10A, because the combined impedances of the coils $X_u$ and $X_d$ are smaller than the combined impedances in the case of FIG. 10B, the circulating current $I_{CIR\_X}$ is increased. Therefore, as described later, the effect that improves the estimation accuracy of the displacement amount A can be obtained.

On the other hand, the moving member 6 is sometimes inclined in the longitudinal direction in driving. When the moving member 6 is inclined, in the coils $X_1$ and $X_2$ arrayed in the longitudinal direction, induced electromotive force is induced on the upper and lower coils, which is relatively greatly different between the upper and lower coils. Therefore, in the case of FIG. 10A, a circulating current different from the circulating current $I_{CIR\_X}$ illustrated in FIG. 9A is produced on two parallel circuits. In other words, a circulating current carried through the upper front coil $X_{u1}$ and the upper rear coil $X_{u2}$ and a circulating current carried through the lower front coil $X_{d1}$ and the lower rear coil $X_{u2}$ are produced.

However, in the case of FIG. 10B, such circulating currents are reduced. Therefore, as illustrated in FIG. 10B, in the case where the upper front and rear coils are connected in series and the lower front and rear coils are connected in series, circulating current losses can be reduced. Thus, the effect that obtains a highly efficient linear motor can be obtained.

Figure 13:
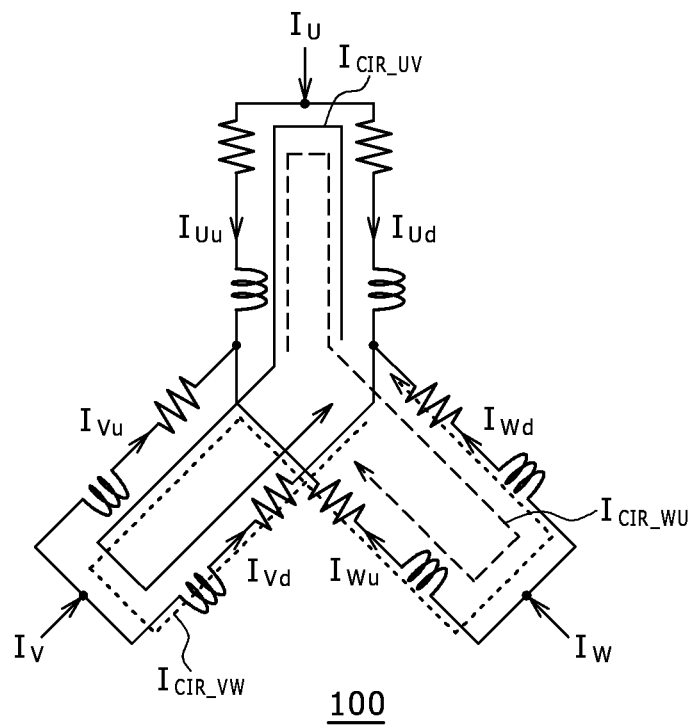
FIG. 13 is a diagram of another example of the circuit configuration of the first armature of the linear motor in FIG. 9A.

As illustrated in FIG. 9A, the phases are connected at a neutral point NP. However, the phases may not be connected as illustrated in FIG. 13. This point will be described later.

<Current Sensor 121>

The current sensor 121 is provided on one phase X or on two or more phases X, and detects electric currents $I_{Xu}$ and $I_{Xd}$ carried thorough the coils $X_u$ and $X_d$, respectively. As illustrated in FIG. 9A, the current sensor 121 according to the embodiment is provided on the U-phase, and includes a current sensor $121_{Uu}$ that detects the electric current of a coil $U_u$ and a current sensor $121_{Ud}$ that detects the electric current of a coil $U_d$. The current sensor 121 can be provided on any phase. The current sensor 121 is enough to detect the electric currents $I_{Xu}$ and $I_{Xd}$ carried through two combined coils $X_u$ and $X_d$ in the same phase X. When the coil Xu or Xd is in parallel connection, the current sensor 121 is disposed at a position at which the current sensor 121 detects the sum of electric currents carried through the upper coils or the lower coils (e.g. see FIG. 10A).

The current sensor 121 feed-backs detected current values $I_{Xu}$ and $I_{Xd}$ to the control unit 101.

<Control Unit 101>

The control unit 101 supplies an output current or the output voltage for driving the linear motor 100 to the phase X, including a difference detecting unit 102, a displacement amount estimating unit 103, and a shaft position control unit 104.

The difference detecting unit 102 obtains a difference ($I_{Xu}-I_{Xd}$) between the detected current values $I_{Xu}$ and $I_{Xd}$ detected at the current sensors 121, and obtains information about the circulating current $I_{CIR\_X}$ In the embodiment, because the current sensors $121_{Uu}$ and $121_{Ud}$ provided on the U-phase detect an electric current $I_{Uu}$ and an electric current $I_{Ud}$, the difference detecting unit 102 obtains a difference ($I_{Uu}-I_{Ud}$) The difference between the electric currents carried through the upper coils and the lower coils of the X-phase. Thus, the circulating current $I_{CIR\_X}$ circulated on the X-phase can be detected (calculated), as described later.

The displacement amount estimating unit 103 estimates (calculates) the displacement amount A of the moving member 6 based on the circulating current $I_{CIR\_X}$ of the X-phase detected at the difference detecting unit 102, as described later. In the embodiment, the displacement amount A is estimated (calculated) based on a circulating current $I_{CIR\_U}$.

This displacement amount A is related to the position of the phase X (the first armature 9) including the current detecting unit, on which the circulating current $I_{CIR\_X}$ is carried, at the position of the moving member 6 in the longitudinal direction.

The shaft position control unit 104 controls the output current or the output voltage to the windings 8 of the first armature 9, the windings 8 of the second armature 90, or the windings 8 of the first and second armatures 9 and 90 in order to reduce the displacement amount A (to reduce the circulating current $I_{CIR\_X}$), based on the displacement amount A estimated at the displacement amount estimating unit 103. Thus, the output current or the output voltage is controlled to reduce the displacement amounts A related to the first armatures 9.

As illustrated in FIG. 9B, the control unit 101 can control the output current or the output voltage to the windings 8 of the second armature 90. In the embodiment, output currents $I_{M1}$ and $I_{M2}$ to the windings 8 of the second armature 90 are controlled according to the obtained displacement amount A. The output current or the output voltage to the windings 8 of the second armature 90 may be kept nearly constant regardless of the displacement amount A.

<Estimation Method of the Displacement Amount A>

Figure 11A:
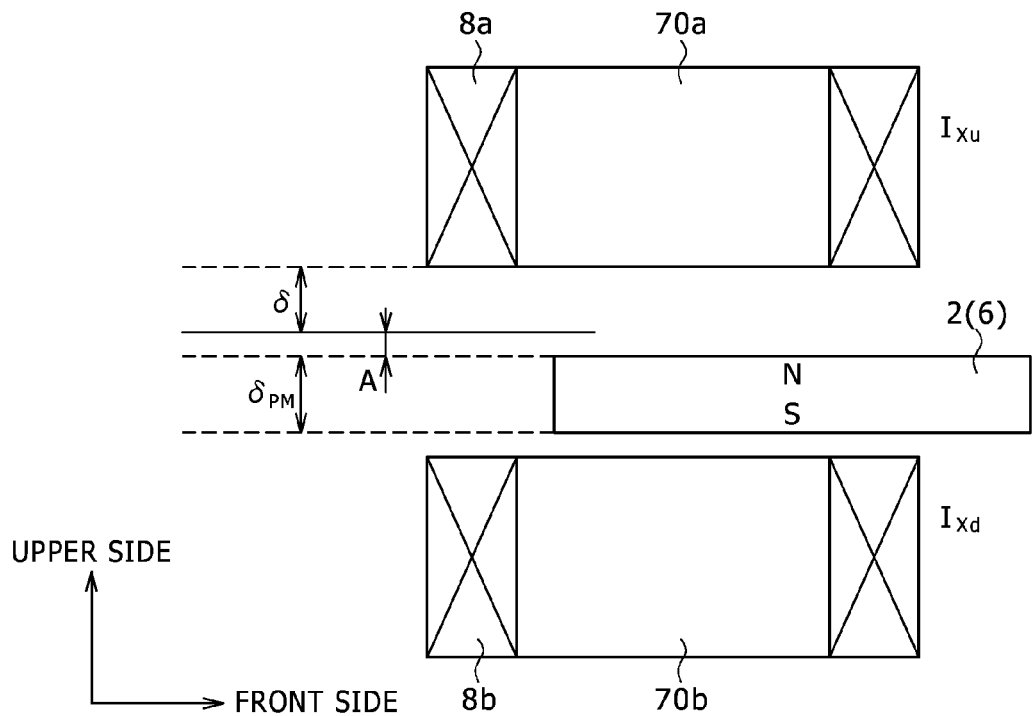
FIG. 11A is a side cross sectional view of the linear motor.
Figure 11B:
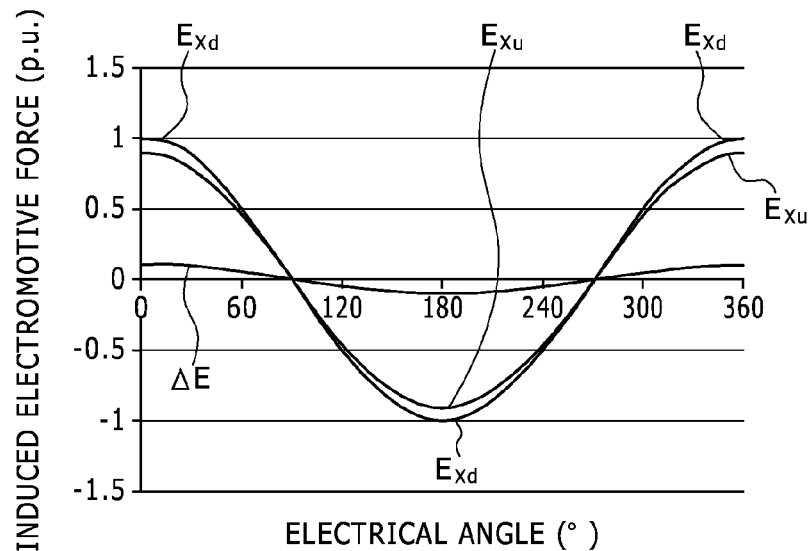
FIG. 11B is a graph of the relationship of the electric current phase of a winding to induced electromotive force of a closed circuit.

The control unit 101 of the control system 1000 according to the embodiment estimates information A expressing the displacement amount from the detected circulating current $I_{CIR\_X}$. Referring to FIGS. 11A and 11B, the basic principle to estimate the displacement amount A from the circulating current $I_{CIR\_X}$ will be described.

In the following description, the influence of gravity is ignored, and the winding sets (the upper coil $X_u$ and the lower coil $X_d$) of the first and second armatures 9 and 90 have the same properties. In this case, because the electric currents $I_{Xu}$ and $I_{Xd}$ are equal, which are obtained by diverting the output current of the control unit 101, the moving member 6 reciprocates in the state in which a distance (a gap length δ) from the upper surface of the permanent magnet 2 to the upper magnetic pole tooth is equal to a distance (a gap length δ) from the lower surface of the permanent magnet 2 to the lower magnetic pole tooth. The gap length δ can be obtained in advance by measurement. As illustrated in FIG. 11A, the gap length δ may be obtained as a value that a length $δ_{PM}$ of the permanent magnet 2 in the vertical direction is subtracted from the gap length of two magnetic pole teeth 70 to obtain a value and then this value is divided by two.

The displacement amount of the moving member 6 from the shaft center in the vertical direction is defined as A. A=0, where the moving member 6 is located on the shaft center.

[Detection of the Circulating Current]

First, let us consider the case where the moving member 6 reciprocates in the longitudinal direction in the state in which the moving member 6 is located on the shaft center. As illustrated in FIG. 9A, the control unit 101 inputs an electric current $I_X$ to the phases X. Because the properties of the upper and lower coils $X_U$ and $X_d$ are equal as assumed, the electric current $I_X$ is equally distributed to the upper and lower coils $X_U$ and $X_d$. In other words, an electric current carried through a coil $X_Y$ is defined as $I_{XY}$, and then the relationship $I_{Xu}=I_{Xd}$ is held. In this case, no circulating current is produced. In the embodiment, the current sensor 121 is provided in series to the coils $U_u$ and $U_d$, and thus the currents $I_{Uu}$ and $I_{Ud}$ can be known.

When the moving member 6 is displaced from the shaft center (the displacement amount A is not zero), the time jitters of magnetic flux applied from the permanent magnet 2 to the coils $X_u$ and $X_d$ are varied from each other. Thus, a potential difference ΔE is produced on the circuit including the parallel coils $X_u$ and $X_d$ illustrated in FIG. 9A. In order to cancel the potential difference ΔE, the circulating current $I_{CIR\_X}$ is produced in the closed loop of the parallel circuit. In other words, the relationship $I_{Xu} \neq I_{Xd}$ is held.

Here, Equation 1 is derived from the relationships $$I_{Xu}=IX/2+I_{CIR\_X}$$

$$I_{Xd}=IX/2-I_{CIR\_X}$$

$$I_{CIR\_X} = \frac{I_{Xu} - I_{Xd}}{2}, X = U, V, W \quad \text{Equation 1}$$

As described above, the current sensor 121 detects the currents $I_{Uu}$ and $I_{Ud}$, and thus the circulating current $I_{CIR\_U}$ can be found from the differential value between the values of the currents $I_{Uu}$ and $I_{Ud}$.

[Estimation of the Displacement Amount Using the Circulating Current]

The circulating current $I_{CIR\_X}$ when the moving member 6 is displaced by the displacement amount A in the gap of the phase X can be given by Equation 2 using constants α and κ.

$$\alpha\kappa\left(\frac{1}{\delta - A} - \frac{1}{\delta + A}\right) = I_{CIR\_X} Z_{1\_2} = \Delta E \quad \text{Equation 2}$$

where $$\Delta E = E_{Xu} - E_{Xd}$$

Here, δ is the gap length from the surface of the permanent magnet 2 to the magnetic pole tooth 70 in the state in which the moving member 6 is located on the shaft center. $Z_{1\_2}$ is the impedance of the closed loop through which the circulating current $I_{CIR\_X}$ is carried. $\Delta E$ is the potential difference (the difference in induced electromotive force) in the closed circuit through which the circulating current is carried. $E_{Xu}$ is the voltage induced on the upper coil of the closed circuit through which the circulating current is carried. $E_{Xd}$ is the voltage induced on the lower coil of the closed circuit through which the circulating current is carried.

As described above, the circulating current $I_{CIR\_U}$ and the gap length $\delta$ are known in the U-phase provided with the current sensor 121. The impedance $Z_{1\_2}$ is obtained from the resistance component R and the inductance L, which are known values, of the coil (e.g. see FIG. 9). Therefore, because only the displacement amount A is unknown in Equation 2, the displacement amount A can be solved in the phase provided with the current sensor 121. In the embodiment, the displacement amount A of the U-phase can be obtained as described above.

From the result of Equation 2, the impedance $Z_{1\_2}$ and the induced electromotive force difference $\Delta E$ are proportional to the frequency, and a product of the circulating current $I_{CIR\_X}$ and the impedance $Z_{1\_2}$ is equal to the induced electromotive force difference $\Delta E$. This shows that the circulating current $I_{CIR\_X}$ has little frequency dependence. Therefore, the displacement amount A can be highly accurately estimated using the circulating current $I_{CIR\_X}$ even in a low frequency area (low output drive).

The displacement amount A depends on the size of the circulating current $I_{CIR\_X}$. In order to enhance the detection accuracy of electric currents at the current detecting unit, a configuration is preferable in which a large circulating current $I_{CIR\_X}$ is produced. Therefore, the connection of the windings in the phase X as illustrated in FIG. 10A is preferable from the viewpoint of the estimation accuracy of the displacement amount A.

As described above, the difference detecting unit 102 detects the circulating current $I_{CIR\_X}$, and the displacement amount estimating unit 103 calculates using the relationships of Equation 2. Thus, the displacement amount A can be estimated. Accordingly, the control unit 101 can estimate the displacement amount and the direction with respect to the moving member 6 in the vertical direction.

<Feed-Back Control Using the Displacement Amount A>

Using the basic principle, the shaft position control unit 104 of the control unit 101 estimates the displacement amount A, and can control the eccentricity of the moving member 6 based on the estimated result. As described in detail later, the estimation of the displacement amount A at two or more places enables the estimation of the inclination amount of the moving member 6 in the longitudinal direction as well. Thus, inclination can be controlled.

Therefore, according to the embodiment, the shaft position of the moving member 6 can be controlled (eccentricity, inclination, or eccentricity and inclination can be controlled). For example, in the case where it is estimated that the displacement amount A is not zero, the control unit 101 can perform various ways of publicly known control, such as changing outputs to the coils, as making reference to the position of the moving member 6 (the position of the permanent magnet 2).

As described above, the control system 1000 according to the embodiment determines the displacing direction (the vertical direction) and the displacement amount of the moving member 6 using two current sensors 121, which are an example of the current detecting unit provided on one phase or two or more phases, and the control system 1000 can control the shaft position. The current sensor is less expensive than a displacement sensor (e.g. an eddy current displacement sensor), and the space for mounting the sensor is small. Thus, a space-saving control system at low costs can be formed.

<Estimation of the Inclination Amount of the Moving Member>

In the embodiment, the linear motor 100 includes two first armatures 9 arrayed in the longitudinal direction. Therefore, as described later, the inclination of the moving member 6 in the longitudinal direction can be estimated by comparing the displacement amounts A in two or more first armatures 9. This will be described with reference to FIGS. 14 and 15.

Figure 14:
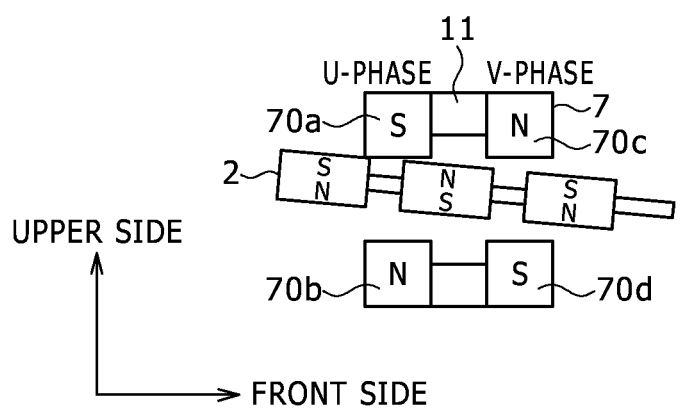
FIG. 14 is a schematic diagram of the linear motor viewed from the side face in the case where a moving member according to the first embodiment is inclined in a longitudinal direction.
Figure 15:
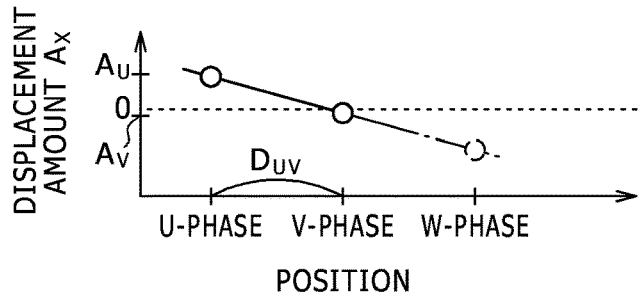
FIG. 15 is a diagram of the relationship of the amounts of displacement of the moving member in the vertical direction in phases to distances among the phases in the case of FIG. 14.

As illustrated in FIG. 14, let us consider the case where the moving member 6 is inclined in the longitudinal direction, where the current detecting unit is disposed on the U-phase and the V-phase. In FIG. 14, for explanation, only one magnetic pole tooth set is illustrated in each of the U-phase and the V-phase.

In this case, a displacement amount $A_U$ of the moving member 6 to the U-phase is different from a displacement amount $A_V$ of the moving member 6 to the V-phase. Therefore, circulating currents $I_{CIR\_U}$ and $I_{CIR\_V}$ carried through the U-phase and the V-phase, respectively, have different values.

Because a distance $D_{UV}$ between the U-phase and the V-phase (the distance between the first armatures 9) can be measured in advance, the distance $D_{UV}$ has a known value. Because the moving member 6 has a linear shape, the inclination amount of the moving member 6 can be estimated by dividing the difference between the displacement amounts $A_U$ and $A_V$ by the distance $D_{UV}$ (see FIG. 15). The direction of inclination can be found by the relationship between the sizes of the displacement amounts $A_U$ and $A_V$.

<Compensation of the Inclination Amount of the Moving Member>

The control unit 101 controls the voltage or the electric current outputted to the winding 8 of the phases based on information about the obtained inclination amount. Thus, the inclination of the moving member 6 can be compensated. The control unit 101 according to the embodiment can independently control the voltage or the electric current outputted to the winding 8 of the phases. Therefore, in the case where the moving member 6 is inclined downward to the front as illustrated in FIG. 14, the output to the phases may be controlled in such a manner that, for example, the moving member 6 is displaced in the downward direction to the U-phase and the moving member 6 is displaced in the upward direction to the W-phase. Although the output to the V-phase may be controlled, the inputs of the U-phase and the W-phase, which are at two ends of the stator 5 in the longitudinal direction, have stronger influence on the inclination of the moving member 6 than the influence of the V-phase. Thus, the outputs to the U-phase and the W-phase are controlled to compensate inclination here. The output to the second armature 90 may be controlled to compensate the inclination of the moving member 6.

The displacement amount A can be estimated as well by providing the current detecting unit on the second armature 90. In this case, the upper winding and the lower winding of the second armature 90 are connected in parallel, and a current detecting unit is provided to detect electric currents carried through the upper winding and the lower winding. In other words, in the embodiment, the displacement amount A can be estimated using given two armatures disposed in the longitudinal direction and including one or more winding sets.

<Other Configurations>

As illustrated in FIG. 11A, in the linear motor according to the embodiment, the coils $X_U$ and $X_d$ are disposed in such a manner that the positions of the coils $X_U$ and $X_d$ are arrayed (the coils $X_U$ and $X_d$ are arrayed when viewed from the top face). Thus, the phases of the magnetic flux penetrating the coils $X_U$ and $X_d$ are nearly equal, and as illustrated in FIG. 11B, the phases of the induced electromotive forces $E_{Xu}$ and $E_{Xd}$ induced on the coils $X_U$ and $X_d$ are nearly equal. Because the induced electromotive force difference ΔE that produces the circulating current is only caused from the displacement amount A, the displacement amount A is easily calculated.

Figure 12A:
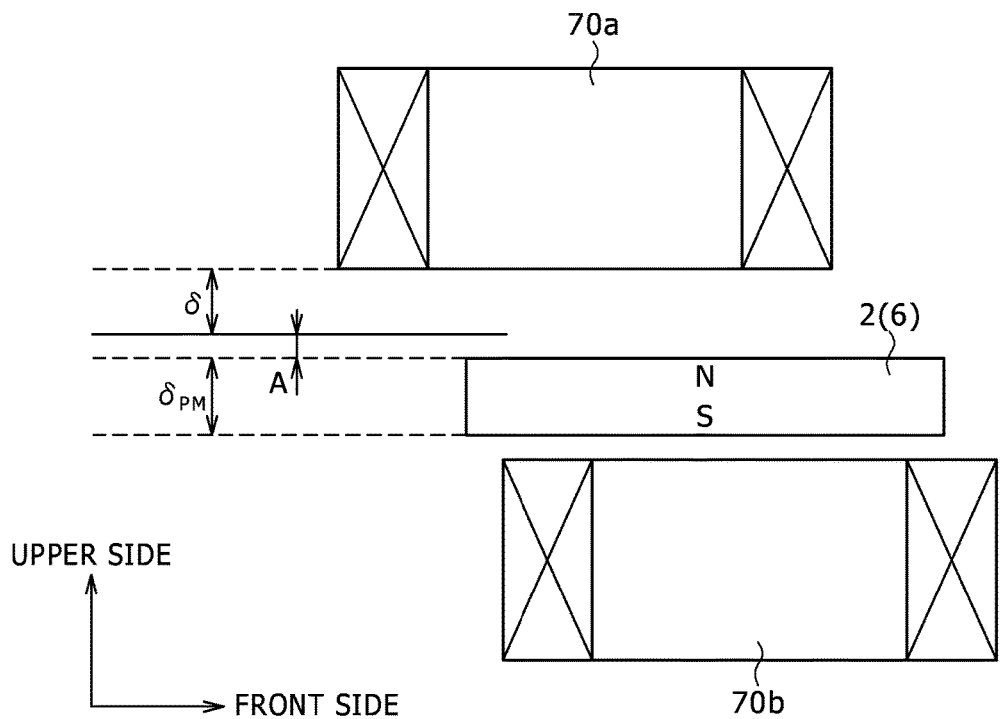
FIG. 12A is a side cross sectional view of the linear motor illustrating magnetic pole tooth sets displaced to each other.
Figure 12B:
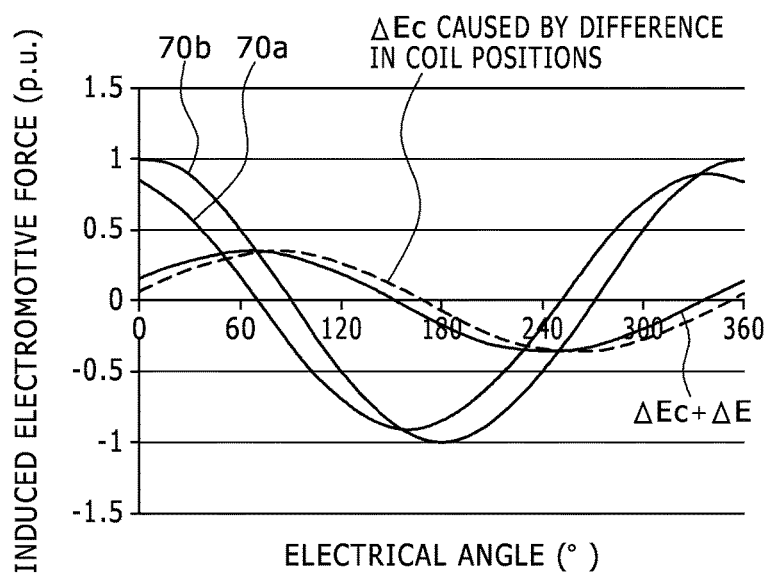
FIG. 12B is a graph of the relationship of the electric current phase of a winding to induced electromotive force of a closed circuit.

However, on the other hand, as illustrated in FIGS. 12A and 12B, in the case where the coil $X_U$ is opposed to the coil $X_d$ as the coils $X_U$ and $X_d$ are partially displaced from each other in the longitudinal direction, an induced electromotive force difference component is produced due to the displacement of the magnetic pole teeth 70. Also in this case, the phase difference of the induced electromotive force is determined from the difference in spatial positions of the magnetic pole teeth for correction. Thus, the displacement amount A can be estimated.

In the embodiment relating to the linear motor in symmetric three-phase drive, the neutral point NP of the windings 8 is connected as illustrated in FIG. 9A. However, also in the case of a circuit configuration in which a neutral point is not connected as illustrated in FIG. 13, the similar effect can be obtained by the method similar to the embodiment. When the neutral point is not connected, the assembly of the motor can be simplified.

In the case where the shaft center is displaced in the initial state because of the influence of the tolerance in assembly, the value is corrected as a bias by Equations 1 and 2. Thus, the similar effect can be obtained.

Because the permanent magnet 2 and the magnetic pole tooth 70 are in a flat plate shape having the width in the lateral direction, magnetic force working across the permanent magnet 2 and the magnetic pole tooth 70 can provide force to return the moving member 6 in the horizontal attitude even though the moving member 6 is inclined in the lateral direction for some reason.

Second Embodiment

Figure 16:
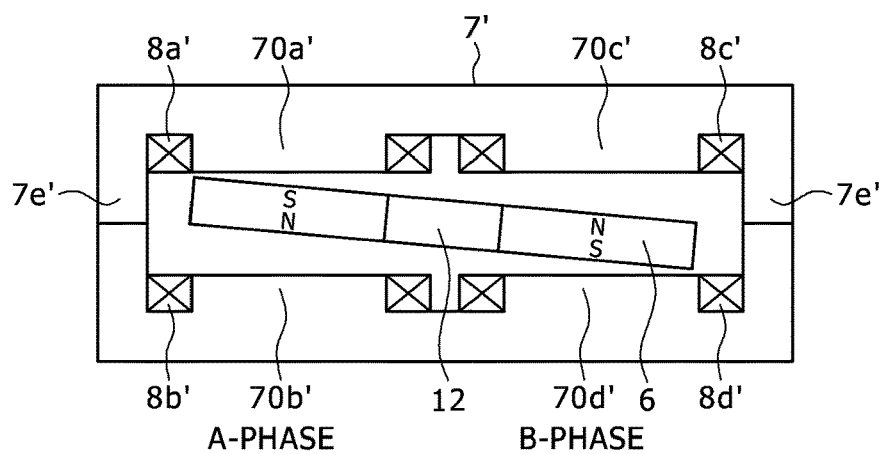
FIG. 16 is a schematic diagram of a linear motor viewed from the front side in the case where a moving member according to a second embodiment is inclined in the lateral direction.
Figure 17:
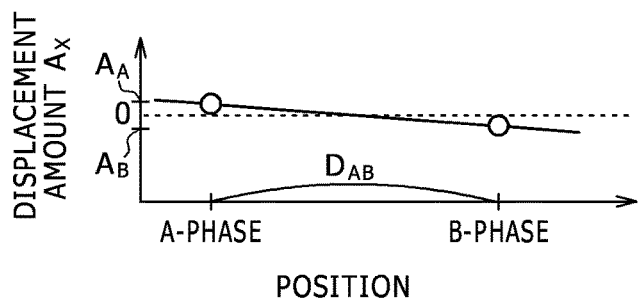
FIG. 17 is a diagram of the relationship of the amounts of displacement of the moving member in the vertical direction in phases to distances among the phases in the case of FIG. 16.

Next, referring to FIGS. 16 and 17, a second embodiment will be described. The configuration of the embodiment can be different in the following point from the first embodiment.

A magnetic pole 7' of a first armature 9' according to the embodiment has two magnetic pole tooth sets arrayed in the lateral direction. In other words, the first armature 9' according to the embodiment has two winding sets arrayed in the lateral direction. These sets are called an A-phase and a B-phase.

In the case where the reciprocating force of a linear motor 100 is desired to increase, it is thought to upsize dimensions in the lateral direction, for example. In this case, an increase in the length in the lateral direction causes a moving member 6 to be easily inclined in the lateral direction. In the embodiment, the inclination of the moving member 6 in the lateral direction can be more efficiently corrected.

The magnetic pole 7' of the first armature 9' according to the embodiment includes one set of magnetic pole teeth 70a' and 70b' provided on the left side and one set of magnetic pole teeth 70c' and 70d' provided on the right side. A winding 8' (8a' to 8d') is wound on the magnetic pole teeth 70.

The moving member 6 according to the embodiment includes two permanent magnets 2 in the lateral direction through a magnet fixing portion 12 formed of a non-magnetic material.

The number of the permanent magnets 2 in the lateral direction may be three or more. The permanent magnets 2 arrayed in the lateral direction opposed to different magnetic pole teeth 70' may have different polarities. Two permanent magnets 2 according to the embodiment arrayed on the left and right are magnetized in the same polarity in the vertical direction. However, two permanent magnets 2 may be magnetized in different polarities. One permanent magnet 2 may be disposed, without the magnet fixing portion 12. However, because of the strength or detent power of the permanent magnet 2, the permanent magnet 2 is preferably split into a plurality of pieces with the magnet fixing portion 12 disposed.

Similarly to the method of obtaining the inclination amount in the longitudinal direction, which is described in the first embodiment, the inclination amount in the lateral direction can be found. In other words, as illustrated in FIG. 16, the inclination of the moving member 6 in the lateral direction can be estimated using a displacement amount $A_A$ in the A-phase, a displacement amount $A_B$ in the B-phase, and a mechanical distance $D_{AB}$ between the A-phase and the B-phase.

A control unit 101 is configured to independently control a voltage or an electric current outputted to the windings 8' of the A-phase and the B-phase. Therefore, as illustrated in FIGS. 16 and 17, in the case where the moving member 6 is inclined downward in the right direction, the output is controlled in such a manner that the moving member 6 is displaced in the downward direction in the A-phase and the moving member 6 is displaced in the upward direction in the B-phase.

A control system 1000 according to the embodiment can be configured as well in which two or more first armatures 9 are arrayed in the lateral direction. A second armature 90 may have a mechanical structure similar to the first armature 9'.

Third Embodiment

Next, referring to FIGS. 18 and 19, a third embodiment will be described. The configuration of the embodiment can be different in the following point from the first or second embodiment.

Figure 18:
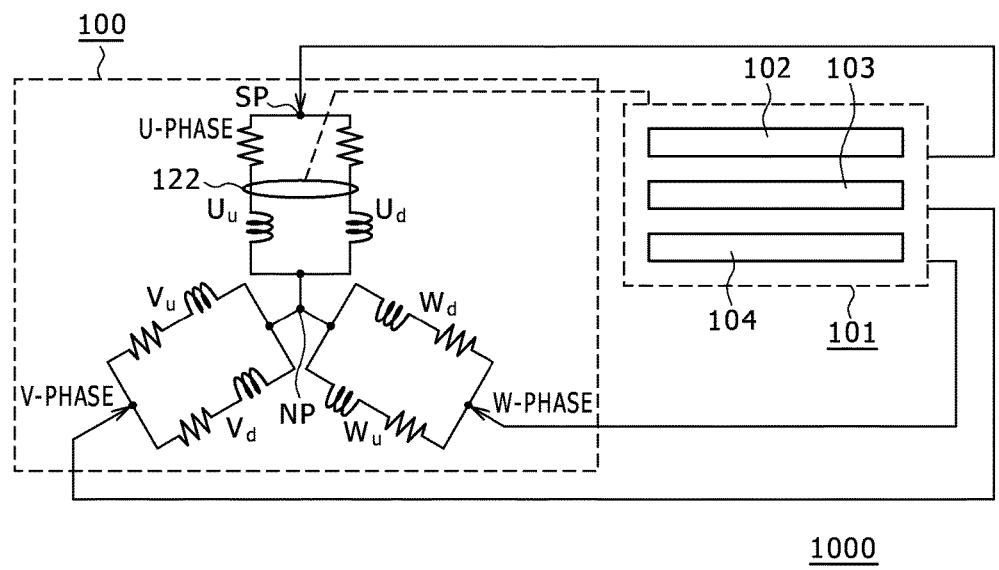
FIG. 18 is a block diagram of a circuit of a control system according to a third embodiment.

FIG. 18 is a block diagram of a circuit of a control system 1000 according to the embodiment. FIG. 19 is a perspective view of amounting method for a current transformer 122 according to the embodiment. As illustrated in FIG. 19, a difference detecting unit 102 according to the embodiment includes the current transformer 122 as a current detecting unit. The current transformer 122 is located between a branch point SP of coils $U_u$ and $U_d$ and a neutral point NP. The branch point SP is a node of the control unit 101 in the nodes of the coils $X_u$ and $X_d$ in parallel connection. The current transformer 122 is provided on any phases. In the embodiment, the current transformer 122 is provided on the U-phase.

Figure 19:
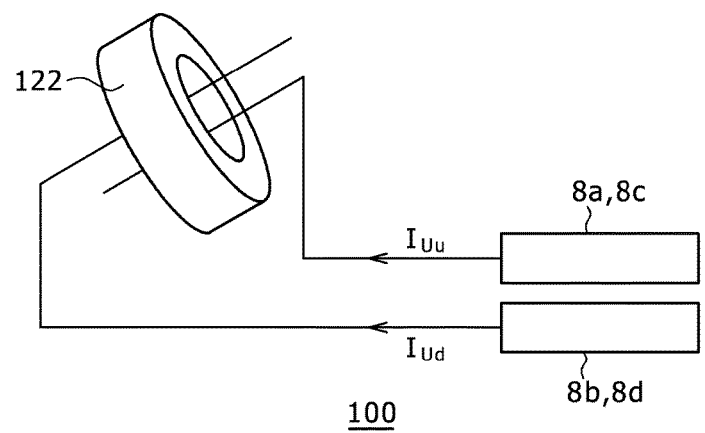
FIG. 19 is a perspective view of mounting a current transformer according to a third embodiment.

The current transformer 122 is a current sensor that detects an electric current carried through the insertion hole of the current transformer 122 (the insertion hole is the inside of the ring in FIG. 19). As illustrated in FIG. 19, into the insertion hole of the current transformer 122, two leads are inserted in series connection to a combined coil $U_u$ (windings 8a and 8c), through which an electric current $I_{Uu}$ is carried, and to a combined $U_d$ (windings 8b and 8d), through which an electric current $I_{Ud}$ is carried. Two leads are inserted into the insertion hole of the current transformer 122 so that electric currents are carried in the opposite orientations. FIG. 18 is a circuit diagram, in which electric currents in the same orientation are seemingly carried. However, actually as illustrated in FIG. 19, the leads are inserted into the current transformer 122 so that electric currents are carried in the opposite orientations.

With this configuration, the current transformer 122 detects a differential current $(I_{Uu}-I_{Ud})$. Because information necessary in Equation 1 is the difference between the values $I_{Uu}$ and $I_{Ud}$ of electric currents, not the values $I_{Uu}$ and $I_{Ud}$, the displacement amount A can be estimated.

According to the embodiment, the effect similar to the effect of the first or second embodiment can be obtained using one current transformer 122 instead of two current sensors 121. Because the current transformer 122 detects the differential current $(I_{Uu}-I_{Ud})$, not the current values themselves, the current transformer 122 may have a small measurable range.

In the embodiment, the description is made as the current transformer 122 is used, which is a device of a current transformer type. However, any current sensors according to other methods may be used, in which a magnetic field strength is found from electric currents in the insertion hole of the current sensor and then current values are found.

Fourth Embodiment

Figure 20:
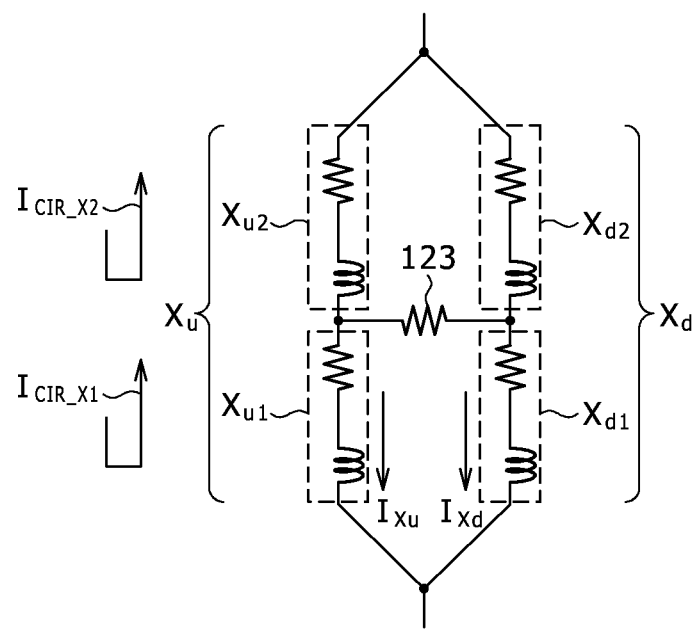
FIG. 20 is a circuit diagram of a Wheatstone bridge according to a fourth embodiment.

Next, referring to FIG. 20, a fourth embodiment will be described. The configuration of the embodiment can be different in the following point from the first to the third embodiments.

At least one phase (a phase X) of a first armature 9 according to the embodiment includes two winding sets. Instead of the current sensor 121 and the current transformer 122, the phase X includes a resister 123 in which one end is connected between an upper front coil $X_{u1}$ and an upper rear coil $X_{u2}$ and another end is connected between a lower rear coil $X_{d1}$ and an upper rear coil $X_{d2}$.

Because the resister 123 is provided, passages are formed in the phase X, in which a front circulating current $I_{CIR\_X1}$ is carried through a front coil $X_1$ and the resister 123 and a rear circulating current $I_{CIR\_X2}$ is carried through a rear coil $X_2$ and the resister 123. When a moving member 6 is located in the shaft center, the circulating currents $I_{CIR\_X1}$ and $I_{CIR\_X2}$ are carried through the resister 123 in the same size in the opposite orientations. However, when the moving member 6 is inclined in the longitudinal direction, voltages induced on the upper coil of one of the front coil $X_1$ and the rear coil $X_2$ and on the lower coil of the other are increased. At the same time, voltages induced on the lower coil of one of the front coil $X_1$ and the rear coil $X_2$ and on the upper coil of the other are reduced. Therefore, a difference is produced between the sizes of the circulating currents $I_{CIR\_X1}$ and $I_{CIR\_X2}$ carried through the resister 123. As a result, the electric currents are carried through the resister 123.

The phase X provided with the resister 123 includes a current detecting unit (not illustrated) that detects the electric currents of the resister 123. Therefore, in the embodiment, with the use of the resister 123 and one current sensor 121 as a current detecting unit, for example, the inclination amount of the moving member 6 in the longitudinal direction can be detected.

This inclination amount can be obtained according to the displacement amounts A related to two magnetic pole tooth sets of the first armature 9 configuring the phase X. Therefore, in the combination of the current detecting unit described in the first embodiment and other embodiments, the inclination amount can be obtained using one first armature 9 as well as the displacement amount of the moving member 6.

The displacement amount A is given by Equation 3 below.

$$KA = V_{out} = V_{in} \frac{X_{d2}X_{u1} - X_{u2}X_{d1}}{(X_{d2}+X_{d1})(X_{u2}+X_{u1})} \quad \text{Equation 3}$$

where K is a constant determined from the combined resistance of the phase X including the resister 123, A is the displacement amount of the moving member 6, $V_{out}$ is the voltage of the resister 123, and $V_{in}$ is the voltage of the phase X.

A coil or a capacitor may be used, instead of or in addition to the resister 123.

Fifth Embodiment

[Compressor]

A compressor, which is an example of equipment equipped with the linear motor 100 will be described.

Figure 21:
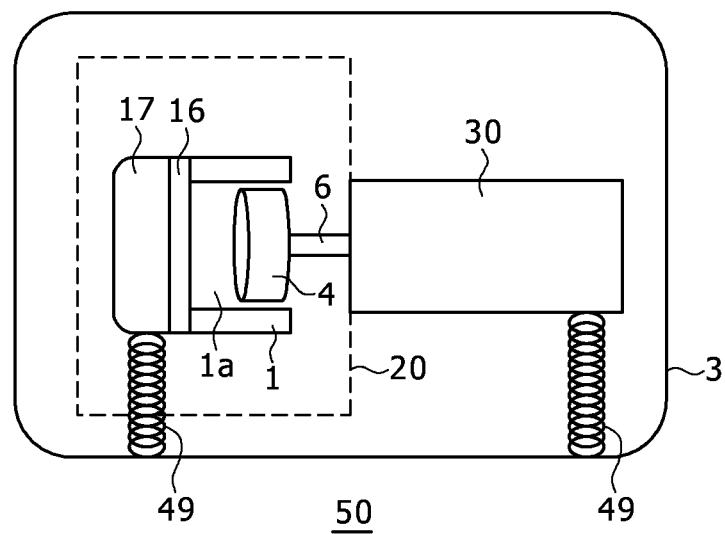
FIG. 21 is a vertical cross sectional view of a hermetic compressor according to a fifth embodiment equipped with a linear motor.

FIG. 21 is a vertical cross sectional view of a hermetic compressor 50 equipped with the linear motor 100.

The hermetic compressor 50 is a reciprocating compressor including a compression element 20 and a dynamoelectric element 30 disposed in a closed container 3. The compression element 20 and the dynamoelectric element 30 are elastically supported in the closed container 3 by a support spring 49.

The compression element 20 includes a cylinder block 1 forming a cylinder 1a, a cylinder head 16 assembled on the end face of the cylinder block 1, and a head cover 17 forming a discharge chamber space. A working fluid is supplied to the inside of the cylinder 1a, and the working fluid is compressed by the reciprocation of a piston 4. The compressed working fluid is delivered to a discharge pipe in communication with the outside of the compressor. In the embodiment, a structure is formed in which one piston 4 is joined to one end of the moving member 6 in the longitudinal direction. Therefore, the cylinder block 1 has a structure in which one cylinder 1a is disposed. The dynamoelectric element 30 includes the linear motor 100.

Figure 22:
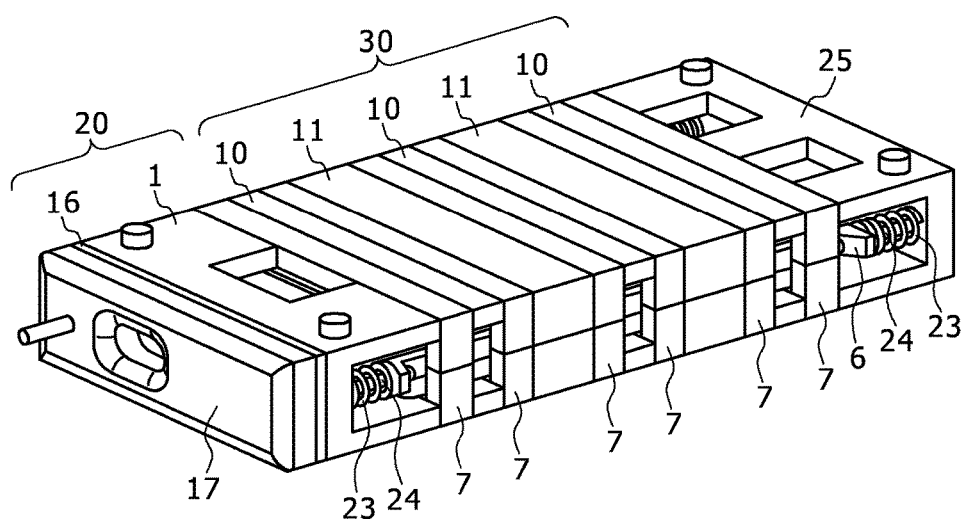
FIG. 22 is a perspective view of the hermetic compressor from which a closed container is removed.

FIG. 22 is a perspective view of the hermetic compressor 50, from which the closed container 3 and other components are omitted.

The compression element 20 is disposed on one end of the dynamoelectric element 30, and an end frame 25 is disposed on the other end. The cylinder block 1 and the end frame 25 may include a guide rod 24. The guide rod 24 guides the moving member 6 in the longitudinal direction, and prevents the moving member 6 from being moved in the lateral direction.

The linear motor 100 according to the first to the fifth embodiments is adapted to the hermetic compressor 50, and thus, the hermetic compressor that exerts the effects described in the first to the fifth embodiment can be obtained.

Sixth Embodiment

[Refrigerator]

Next, a refrigerator 60, which is an example of equipment equipped with the linear motor 100 or the compressor, will be described.

Figure 23:
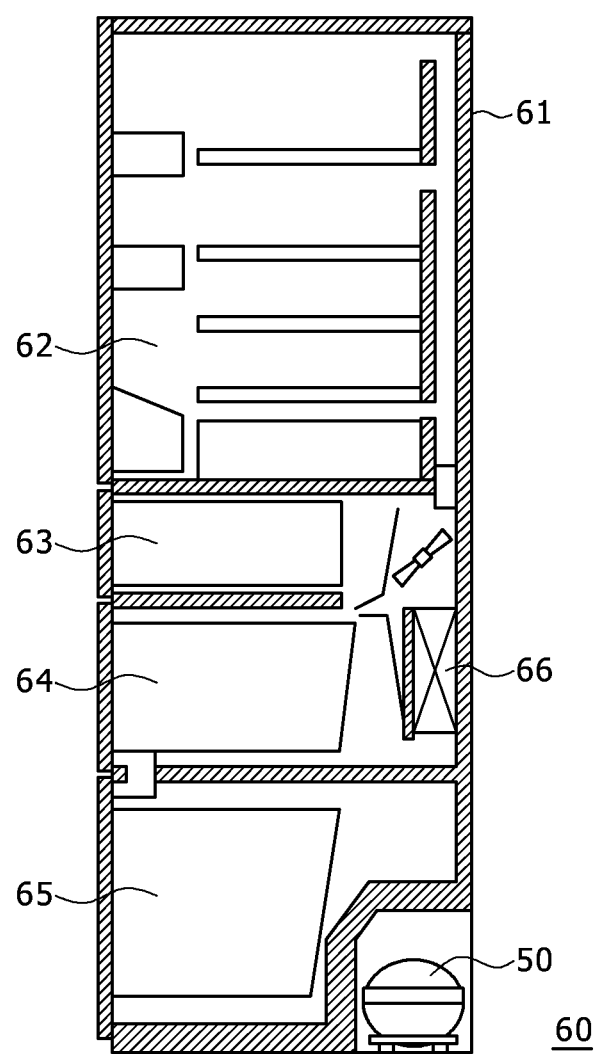
FIG. 23 is a vertical cross sectional view of a refrigerator according to a sixth embodiment mound with a linear motor.

FIG. 23 is a vertical cross sectional view of the refrigerator 60 equipped with the hermetic compressor 50.

In FIG. 23, the linear motor 100 is installed on the hermetic compressor 50. The refrigerator 60 has a refrigeration cycle in which the hermetic compressor 50, a heat dissipation pipe, a capillary tube, and a cooler 66 are joined to one another using a refrigerant such as R-600a. The refrigerator 60 includes, for example, a cold room 62, an upper freezer compartment 63, a lower freezer compartment 64, and a vegetable compartment 65. The spaces in the refrigerator 60 are cooled by operating the refrigeration cycle (not illustrated) due to the drive of the hermetic compressor 50.

Any device can be equipped with the linear motor 100. For the applications of refrigeration and air conditioning in addition to a compressor and a refrigerator, for example, the linear motor 100 can also be adapted to a system for a refrigerator-freezer showcase, for example.

What is claimed is:

1. A linear motor comprising:
a moving member having a permanent magnet;
a first armature having an upper winding and a lower winding opposed to the upper winding through a gap in a vertical direction, and configured to apply thrust and reciprocate the moving member in a longitudinal direction;
two second armatures configured to apply a levitation force to the moving member;
a current detecting unit that detects an electric current carried through the first armature; and
a controller configured to apply respective electric currents to the first armature and the two second armatures,
wherein the upper winding and the lower winding are in parallel connection,
wherein the two second armatures are provided in the longitudinal direction, and one of the two second armatures is provided at a front of a center of gravity of the moving member and the other of the two second armatures is provided at a rear of the center of gravity of the moving member, and
wherein the controller is configured to magnetize each of the two second armatures to have a same polarity as the permanent magnet respectively opposed thereto.

2. The linear motor according to claim 1, wherein the current detecting unit includes two current sensors that detect an electric current carried through the upper winding and an electric current carried through the lower winding.

3. The linear motor according to claim 1, wherein the current detecting unit includes a current transformer disposed to detect a difference between an electric current carried through the upper winding and an electric current carried through the lower winding.

4. The linear motor according to claim 1,
wherein the first armature includes two sets of the upper winding and the lower winding opposed to the upper winding through the gap in the vertical direction;
the two upper windings are in series connection; and
the two lower windings are in series connection.

5. A linear motor comprising:
a first armature having two sets of an upper winding and a lower winding opposed to the upper winding through a gap in a vertical direction;
a moving member having a permanent magnet and enabled to reciprocate in a longitudinal direction with respect to the first armature;
a current detecting unit that detects an electric current carried through the first armature; and
a resistor, a coil, or a capacitor, or two or more resistors, coils, or capacitors connected between the two upper windings or between the two lower windings,
wherein the two upper windings are in series connection,
wherein the two lower windings are in series connection,
wherein the sets of the upper winding and the lower winding are in parallel connection, and
wherein the current detecting unit includes a current sensor that detects an electric current carried through one of the resistor, the coil, or the capacitor, or an electric current carried through the two or more resistors, coils, or capacitors.

6. A linear motor comprising:
a first armature having two sets of an upper winding and a lower winding opposed to the upper winding through a gap in a vertical direction;
a moving member having a permanent magnet and enabled to reciprocate in a longitudinal direction with respect to the first armature; and
a current detecting unit that detects an electric current carried through the first armature, wherein the two upper windings are in parallel connection,
wherein the two lower windings are in parallel connection, and
wherein the sets of the upper winding and the lower winding are in parallel connection.

7. A compressor comprising:
a moving member having a permanent magnet;
a first armature having an upper winding and a lower winding opposed to the upper winding through a gap in a vertical direction, and configured to apply thrust and reciprocate the moving member in a longitudinal direction;
a second armature configured to apply a levitation force to the moving member;
a current detecting unit that detects an electric current carried through the first armature;
a controller configured to apply respective electric currents to the first armature and the two second armatures;
a piston connected to one end of the moving member; and
a cylinder on which the piston is slid,
wherein the upper winding and the lower winding are in parallel connection,
wherein the two second armatures are provided in the longitudinal direction, and one of the two second armatures is provided at a front of a center of gravity of the moving member and the other of the two second armatures is provided at a rear of the center of gravity of the moving member, and
wherein the controller is configured to magnetize each of the two second armatures to have a same polarity as the permanent magnet respectively opposed thereto.

8. Equipment comprising the linear motor according to claim 1.

* * * * *